Oct. 14, 1947.　　　　E. R. PRICE　　　　2,429,194
CONTROL VALVE
Original Filed July 20, 1942　　3 Sheets-Sheet 1

INVENTOR
EARL R. PRICE
BY
ATTORNEY

Oct. 14, 1947.  E. R. PRICE  2,429,194
CONTROL VALVE
Original Filed July 20, 1942  3 Sheets-Sheet 2

INVENTOR
EARL R. PRICE
BY
*Jm. W. McConkey*
ATTORNEY

Oct. 14, 1947.                    E. R. PRICE                    2,429,194
                                 CONTROL VALVE
                  Original Filed July 20, 1942      3 Sheets-Sheet 3

INVENTOR
EARL R. PRICE
BY
*M. W. McConkey*
ATTORNEY

Patented Oct. 14, 1947

2,429,194

UNITED STATES PATENT OFFICE 2,429,194

CONTROL VALVE

Earl R. Price, South Bend, Ind., assignor to Bendix Aviation Corporation, South Bend, Ind., a corporation of Delaware Continuation of application Serial No. 451,561, July 20, 1942. This application December 24, 1943, Serial No. 515,539

18 Claims. (Cl. 188—3)

This invention relates to valve devices for the control of power motors, and more particularly to a valve usable in a differential air pressure power brake system to advance the application of one power motor with respect to application of another power motor. The present application is a continuation of my previously filed copending application Serial No. 451,561, filed July 20, 1942, now abandoned.

It is the primary object of this invention to provide a power brake system for a tractor-trailer vehicle combination in which a certain amount of pressure is applied to the trailer brakes before the tractor brakes begin to operate.

A further and more specific object is to provide a tractor-trailer braking system in which the trailer brakes are "advanced" and thereafter "wait" for the tractor brakes in the sense that the pressure on the trailer brakes is not greatly increased above the initial or pre-tractor pressure until the pressure in the tractor system has built up to or near equality or to a normal proportional relationship with the initial pressure in the trailer system, after which pressures on the tractor and trailer brakes increase simultaneously.

In most tractor trailer power braking systems, the trailer brakes are connected to the tractor brakes through a relay valve which operates, whenever the tractor brakes are applied, to apply the trailer brakes. In such a system it is inevitable that the trailer brakes lag slightly behind the tractor brakes at the beginning of the brake application. It is my purpose to utilize a control for trailer brakes which does not depend upon the creation of pressure in the tractor system. It may depend, for example, upon movement of the brake pedal. Thus in one embodiment of my idea I use electric means to cause initial operation of the trailer brakes and I bring the electric means itself into operation by closing a foot pedal controlled switch. The switch may be arranged to close at any time during pedal movement but it is desirable for the purposes of my invention that the switch close before the pedal has moved far enough to "crack" the valve which operates the tractor power brake system.

It is advantageous to have the initial operation of the trailer brakes precede slightly the initial operation of the tractor brakes because, first, the driver is thus given the opportunity to exercise a light control over the trailer brakes without making a full brake application and, second, early application, to a limited extent, of the trailer brakes may serve to prevent skidding of the trailer, a phenomenon generally referred to as "jack-knifing."

Although it is desirable to have the trailer brake application begin ahead of the tractor brake application, it is also desirable that the effect of the unit which initially causes application of the trailer brakes be eliminated as the tractor brakes approach full power application. Thus the tractor and trailer brakes have the same relationship to one another at the end of a heavy brake application that they would have if the means for initially speeding up the trailer brakes were not included in the system. If the load arrangement is such that it is desired to have a proportionately greater pressure applied to the brakes of one of the vehicles throughout the brake range, my invention will not disturb such a relationship.

Other advantageous features of my invention will become apparent during the course of the following description, reference being had therein to the accompanying drawings, in which:

Figure 6 is a close-up, partly in section, showing the switch 62 of Figure 1.

Figure 1:
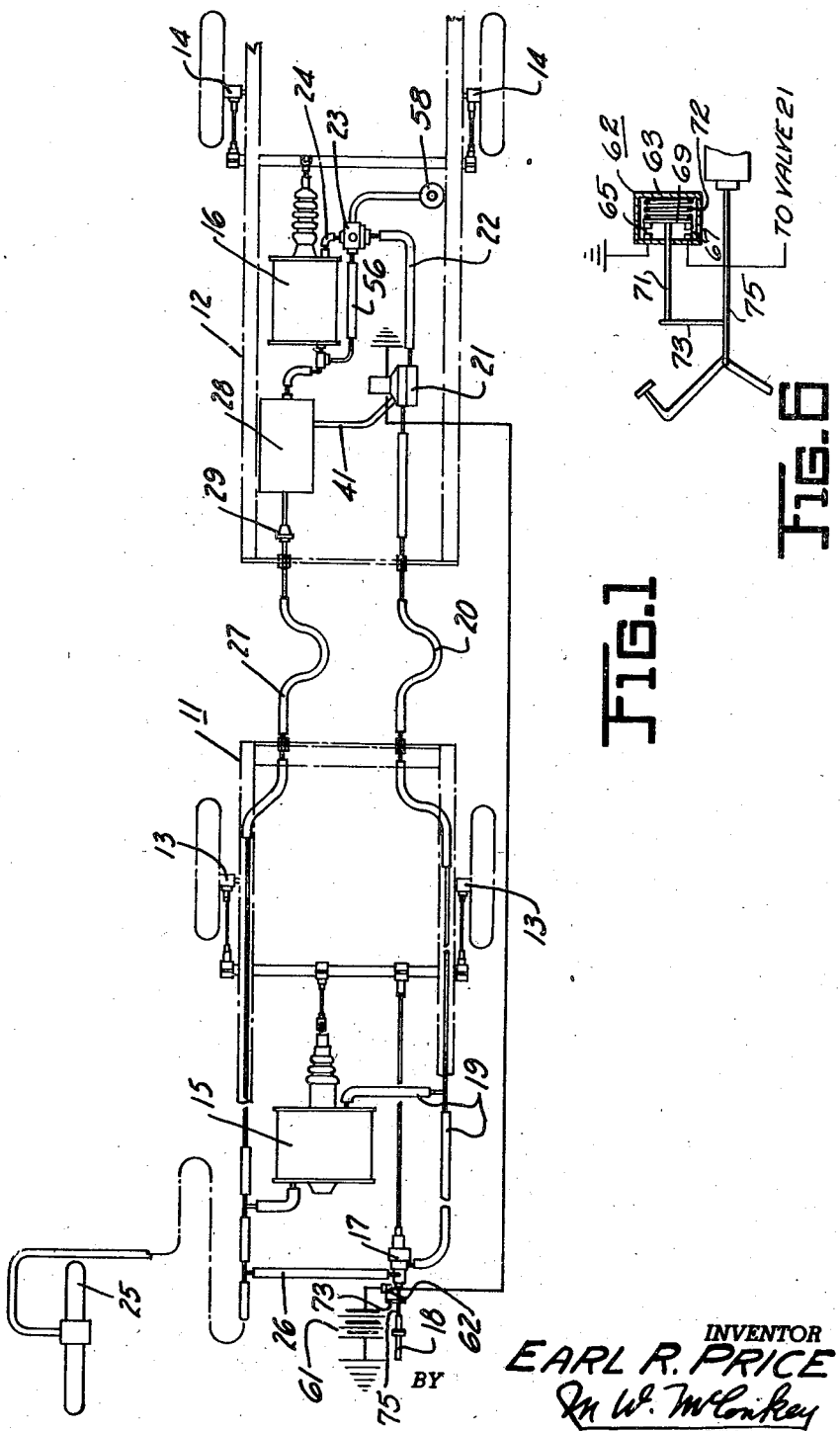
Figure 1 shows diagrammatically a tractor-trailer brake applying hook-up which incorporates my invention.
Figure 2:
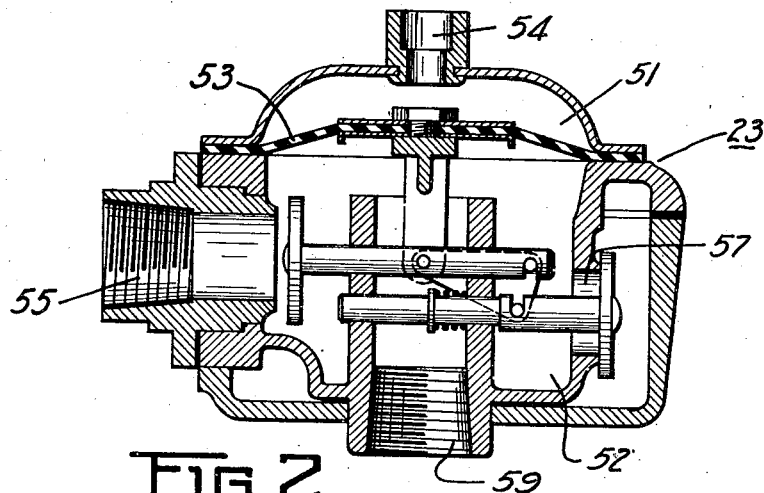
Figure 2 is a vertical section taken through the relay valve of Figure 1.
Figure 3:
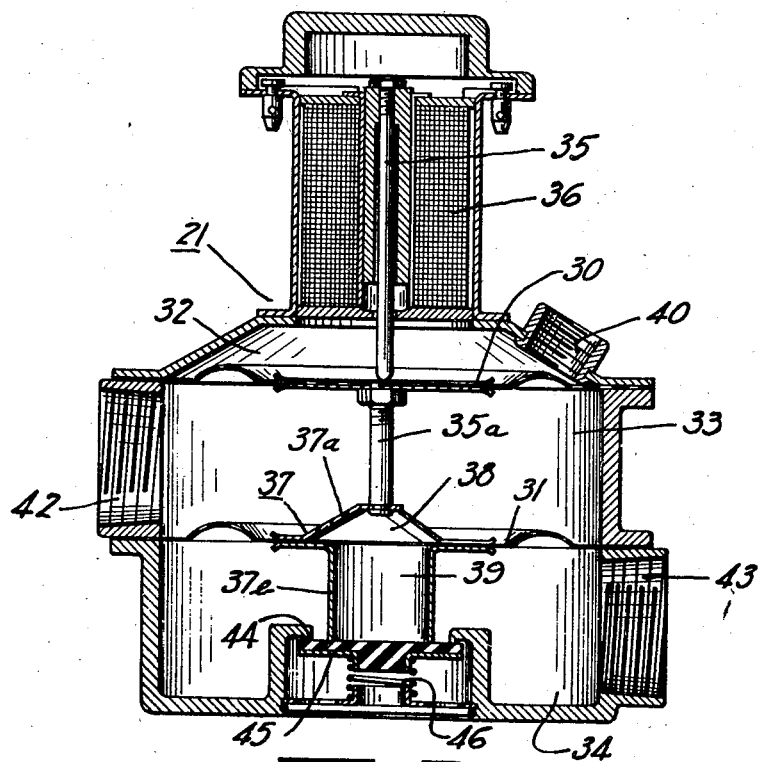
Figure 3 is a vertical section taken through the advance valve of Figure 1, i. e. the valve which causes the initial application of the trailer brakes to precede application of the tractor brakes and which thereafter ceases to have any effect on the ratio of pressures in the brakes of the two vehicles.

The system shown in Figures 1 to 3 includes a tractor 11 and trailer 12 having brakes 13 and 14 respectively and power motors 15 and 16 for applying the respective brakes. A control valve 17 on the tractor is actuable according to the manipulation of a pedal 18, and the valve 17 is in turn connected by a conduit 19 to the tractor power motor 15 for controlling the operation thereof. A conduit 20 connects the control valve 17 to an "advance" valve 21. A conduit 22 connects the "advance" valve 21 to a relay or conversion valve 23, which in turn is connected by a conduit 24 to the trailer power motor. The power motors 15 and 16 may be operated by differential air pressures on opposite sides of the pistons therein. In the brake system of Figure 1, I have utilized the intake manifold of the tractor engine as a source of vacuum which, when opposed by air at atmospheric pressure creates a pressure differential over the power cylinder pistons to apply the brakes. The intake manifold, shown at 25 is connected by conduit 26 to control valve 17 on the tractor and by conduit 27 to a vacuum reservoir tank 28 on the trailer. A one-way check valve 29 should be inserted in line 27 between the intake manifold and the vacuum reservoir tank 28 to maintain the highest vacuum (lowest pressure) attained in the reservoir tank regardless of the degree of vacuum prevailing at the intake manifold. The vacuum power motors 15 and 16 may be of either the atmospheric suspended or vacuum suspended type, i. e. during release either atmosphere or vacuum may prevail on both sides of the piston of a given cylinder. Depending on the type of power motor, vacuum suspended or atmospheric suspended, the valve 23 may be either a relay valve or a conversion valve. As shown both motors 15 and 16 are of the vacuum suspended type and valve 23, seen in section in Figure 2, is the type of valve termed a simple relay valve.

The relay valve shown in Figure 2 is of a type old in the art and comprises a casing divided into a controlling pressure chamber 51 and a controlled pressure chamber 52 by a flexible diaphragm 53. A chamber 51 is connected through a port 54 to the conduit 22 which at its other end is connected to advance valve 21. Chamber 52 is provided with three ports. The first, 55, opens to a conduit 56 which connects to the vacuum reservoir 28; the second, 57, opens to air at atmospheric pressure which may be filtered by an air cleaner 58; and the third, 59, is connected by conduit 24 to one end of power cylinder 16. Valve 23 as shown is a relay valve, and operates a vacuum suspended trailer power motor in response to operation of a vacuum suspended tractor power motor. A relay valve of this type could also be used between two atmospheric suspended power motors. If one of the vacuum power motors is vacuum suspended in release and the other is atmospheric suspended, then a conversion valve will be used in place of the valve 23. Both the relay valve and the conversion valve are well known in the art and do not constitute a part of the invention claimed in this application.

The "advance valve" 21 (see Figure 3) is divided by two flexible diaphragms 30 and 31 into three pressure chambers 32, 33, and 34. A plunger which serves as an armature 35 extends into a central opening in a solenoid winding 36, the solenoid including the winding and the plunger being mounted on or adjacent the casing of the valve 21. The armature plunger 35 contacts at its lower end a rod 35a which is secured to the diaphragm 30 and has fixed thereto at its lower end a cage 37 comprising an upper and lower portion which have clamped between them the inner periphery of the annular diaphragm 31. The upper portion 37a of the cage 37 has a plurality of openings 38 therethrough allowing the chamber 33 to communicate freely with a smaller cylindrical chamber 39 formed by the second portion 37b of the cage 37.

The chamber 32 is at all times connected through a port 40 with a conduit 41 leading from a source of vacuum, such as vacuum reserve tank 28. Chamber 33 is connected through a port 42 with control conduit 20, in which conduit the prevailing pressures correspond to the pressures which operate the tractor power motor 15. A port 43 opens from chamber 34 to conduit 22 which, as pointed out above, is connected through port 54 with chamber 51 of the relay or conversion valve 23. Chamber 34 is also provided with a port 44 which opens to atmosphere whenever it is uncovered by downward movement of a poppet 45, the poppet 45 being urged toward port-closing position by a spring 46. The downwardly extending cylindrical part 37b of the cage 37 forms with the aid of poppet 45, a valve which controls the connection and disconnection of chambers 33 and 34.

The solenoid winding 36 is part of an electrical circuit which is so arranged that the solenoid will be actuated upon slight movement of brake pedal 18. The solenoid is preferably wired in parallel with the stop light of the tractor vehicle. The electrical circuit for controlling the solenoid comprises a battery 61, a pedal controlled switch 62, and the solenoid winding.

Although the particular structure and mode of operation of switch 62 may be varied considerably without departing from the field of the present invention, for purposes of illustration I have shown a switch having a casing 63 (see Figure 6) suitably carried by the vehicle frame, and having one set of contacts 65 supported on the casing and a second set of contacts 67 provided on a movable member 69 which has a stem 71, and which is urged toward contact making position by a spring 72 compressed between member 69 and casing 63. As long as the pedal 18 remains in released position, a projecting member 73 carried by link or rod 75 acts against stem 71 to hold contact points 67 away from contact points 65, thereby holding the switch open. When the operator moves the pedal in the direction to apply the brakes, rod 75 moves toward the left, and projecting member 73 moves with it, thereby permitting spring 72 to close the switch.

Operation of my improved tractor-trailer braking system as shown in Figures 1 to 3 is as follows. Assuming the brakes of both vehicles are released and that the power cylinders 15 and 16 are vacuum suspended during release, manifold vacuum will prevail in conduit 20 and consequently in chamber 33 of the advance valve. Manifold vacuum will also prevail in chamber 34 of the advance valve and in the connected chamber 51 of the relay valve. Any discrepancy in pressure between chambers 33 and 34 of the advance valve will be corrected by movement of cage 37, inasmuch as a pressure above manifold vacuum in chamber 34 would force diaphragm 31 upward opening chamber 33 to chamber 34. Chamber 32 at all times has the vacuum pressure of reservoir tank 28. In the relay valve vacuum port 55 will be open and atmosphere port 57 will be closed so that through port 59 the vacuum condition prevailing in chamber 52 will be communicated to conduit 24. When the operator of the tractor desires to apply the brakes, he will move pedal 18. Before the pedal has moved sufficiently to operate valve 17 and cause to develop a substantial brake applying pressure in power cylinder 15, such pedal movement will close switch 62 energizing the solenoid with the result that plunger 35 will be forced downwardly. This movement of the plunger will act through cage 37 to push poppet valve 45 from its seat, opening chamber 34 to atmosphere and sealing chamber 33 from chamber 34. The increased pressure in chamber 34 owing to admission of atmosphere will be transmitted to diaphragm 53 of the relay valve causing the vacuum valve to close and the atmosphere valve of the relay to open, in turn admitting atmosphere at a pressure greater than manifold vacuum to chamber 52, conduit 24 and the rear of trailer power cylinder 16, thus causing an immediate application of pressure to actuate the trailer brakes. The atmosphere admitted to chamber 34 will exert an upward push on diaphragm 31 tending to move plunger 35 against the force exerted by the solenoid. At a predetermined point the opposing pressures will balance and valve 45 will close port 44 discontinuing the admission of atmosphere to chamber 34. Since this will limit the pressure in chamber 51 of the relay valve, that valve will also move to lapped position, in which position both the vacuum and atmosphere ports are closed, since the pressure in chamber 52 equals the pressure in chamber 51.

If movement of pedal 18 is continued by the operator, valve 17 will be opened, admitting, instead of manifold vacuum, atmosphere at higher than manifold vacuum pressure to the rear of tractor power cylinder 15, causing the application of pressure to the tractor brakes. The same pressure which is admitted to the rear of power cylinder 15 will be admitted to the conduit 20 and chamber 33 of the advance valve. The increase in prevailing pressure in chamber 33 of the advance valve will tend to exert an upward force on diaphragm 30 against the vacuum in chamber 32 proportional to the area of said diaphragm 30. At the same time the increased pressure in chamber 33 will tend to exert a downward force on diaphragm 31 proportional to the annular area of the diaphragm between the valve casing and the cylindrical extension 37b of the cage 37. If we assume that the diaphragms 30 and 31 are approximately equal in circumference, the pressure responsive area of diaphragm 30 will exceed the pressure responsive area of diaphragm 31 by an amount equal to the cross sectional area of cylindrical extension 37b. If the pressure in chamber 33 increases, it will increase the upward force against the plunger 35. When the pressure in chamber 33 is built up to a point approximating the pressure in chamber 34 induced by initial opening of port 44 to atmosphere, pressure in chamber 33 will suffice to overcome the downward force exerted by the solenoid and to force the plunger upward lifting the cylinder 37b from its seat on poppet 45 and allowing free communication between the chambers 33 and 34 through openings 38 and chamber 39. From this point on, conduit 20 will be connected to conduit 22 through chambers 33 and 34 of the advance valve and the tractor-trailer braking system will operate as though the advance valve were not included in the system, since the pressure prevailing in conduit 20 will directly control the relay valve 23. Once the pressure in chamber 33 has become sufficient to positively open the connection between chambers 33 and 34, diaphragm 31 will be neutralized and the downward force exerted by the solenoid will be opposed by the full pressure of atmosphere in chamber 33 acting, over diaphragm 30, against the vacuum prevailing in chamber 32.

Figure 4:
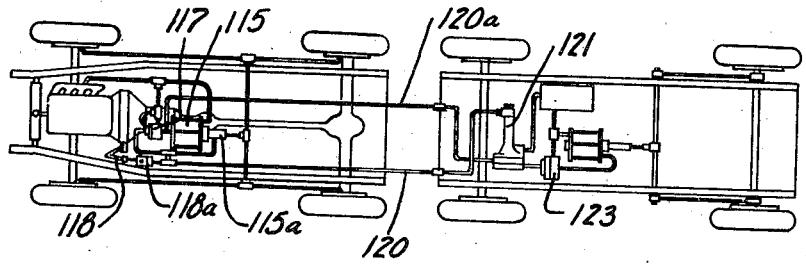
Figure 4 is a diagrammatic hook-up showing a modification of the system of Figure 1 in which a hydraulically controlled advance valve is utilized.
Figure 5:
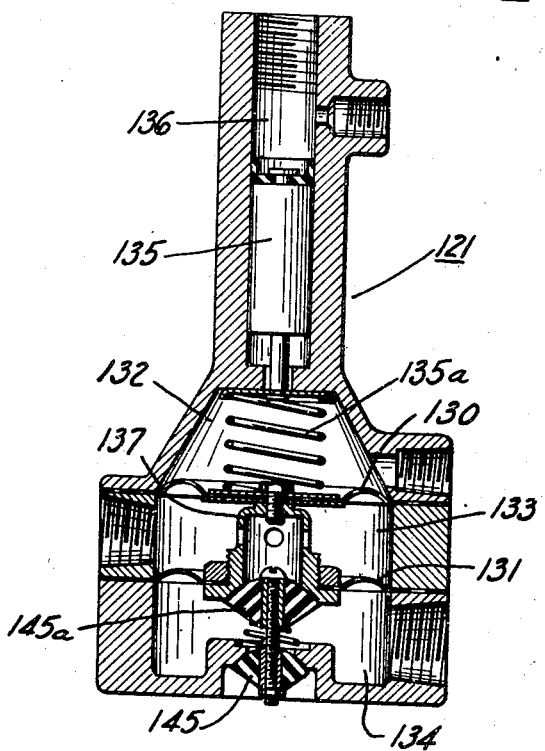
Figure 5 is a vertical section taken through the hydraulically controlled advance valve of Figure 4.

In Figures 4 and 5 I have shown a tractor-trailer braking system in which a hydraulic advance valve is adapted to do the job done by the electrically controlled advance valve of Figures 1 to 3. Because of the similarity between the systems of Figures 1 to 3 and Figures 4 and 5, I have applied numerals to the parts shown on Figures 4 and 5 corresponding to numerals applied to similar parts of Figures 1 to 3 except for the addition of 100. Although the type of power control arrangement to be used on the tractor of Figure 4 is a matter of choice, I have chosen to utilize a power operated hydraulic unit 115a which includes a power cylinder 115 and which is controlled by a valve 117, the valve being operable in response to hydraulic pressure in a master cylinder 118a which is operated by pedal 118. The same pedal created hydraulic pressure which operates the valve 117 is transmitted through a hydraulic line 120 to a chamber 136 in hydraulic advance valve 121. When the hydraulic fluid in chamber 136 is put under pressure by movement of pedal 118, the pressure serves to exert a downward force against a piston or plunger 135 which pushes through a spring 135a against a cage 137 to open a poppet valve 145 admitting atmosphere to a chamber 134 from which chamber such atmosphere is transmitted to chamber 51 of the relay valve, while the pressure of the atmosphere in chamber 134 simultaneously exerts an upward force against the diaphragm 131 opposing the downward force of the hydraulic pressure in chamber 136. Although pressure will be created in the hydraulic lines of the tractor as soon as the pedal 118 is operated, valve 121 can be made to act effectively as an "advance" valve by arranging the sizes of the various pistons and diaphragms in the system so that plunger 135 will be moved to open valve 145 before a substantial pressure has been created in the tractor hydraulic brake system. A certain amount of pressure is required to overcome the springs in the tractor valve 117 and power cylinder 115 and also to overcome the retracting springs at the wheel brakes of the tractor.

As atmospheric pressure builds up in chamber 133 of the advance valve it will eventually cause upward movement of cage 137 owing to the difference in the pressure responsive areas of diaphragms 130 and 131. Upward movement of cage 137 will cause the cage to leave poppet 145a allowing free communication between chambers 133 and 134 so that vacuum control line 120a, which has the same degree of vacuum as power cylinder 115, will be directly connected through chambers 133 and 134 to relay valve 123. Chamber 132 is connected to a constant source of vacuum.

Although I have described certain specific embodiments of my invention it will be appreciated that other embodiments might be made without departing from the scope of the invention. For example, the "advance" valve might be initially actuated by a vacuum responsive diaphragm or by a Bowden wire control. In view of the above, it is my desire not to be limited in the scope of my invention except by the terms of the appended claims.

I claim:

1. In a tractor-trailer braking system having a power device for operating the trailer brakes, a power device for operating the tractor brakes, and a control valve operatively connected to both of said power devices and arranged to operate the same substantially simultaneously maintaining a given ratio of effectiveness between them throughout the operating range, means for applying the trailer brakes ahead of the tractor brakes comprising valve means for causing applying pressure to develop solely in said trailer power device, means for actuating said valve means, means for operating said actuating means independently of said control valve, and a manually operable member for controlling both the last-named means and the aforesaid control valve.

2. In a tractor-trailer braking system having a power device for operating the trailer brakes, a power device for operating the tractor brakes, and a control valve operatively connected to both of said power devices and arranged to operate the same substantially simultaneously maintaining a given ratio of effectiveness between them throughout the operating range, means for applying the trailer brakes in advance of the tractor brakes comprising valve means for causing applying pressure to develop solely in said trailer power device, means for actuating said valve means, means for operating said actuating means independently of said control valve, and means for overcoming the force of said actuating means whenever a given pressure has been reached in the control valve to prevent said actuating means from thereafter having any effect on operation of the tractor-trailer braking system.

3. In a tractor-trailer braking system having a differential air pressure power device for operating the trailer brakes, a differential air pressure power device for operating the tractor brakes, a manually operable control member, and a control valve actuated according to the manual pressure on said control member and operatively connected to both of said power devices, said control valve being arranged to operate said power devices substantially simultaneously maintaining a given ratio of effectiveness between them throughout the operating range, in combination, means for operating said trailer power device in advance of said tractor power device comprising valve means for causing applying pressure to develop solely in said trailer power device, means for actuating said valve means, and means responsive to initial movement of the manually operable control member for operating said actuating means independently of said control valve.

4. In a tractor-trailer braking system having a differential air pressure power device for operating the trailer brakes, a differential air pressure power device for operating the tractor brakes, a manually operable control member, and a control valve actuated according to the manual pressure on said control member and operatively connected to both of said power devices, said control valve being arranged to operate said power devices substantially simultaneously maintaining a given ratio of effectiveness between them throughout the operating range, in combination, means for operating said trailer power device in advance of said tractor power device comprising valve means for causing applying pressure to develop solely in said trailer power device, means for actuating said valve means, means responsive to initial movement of the manually operable control member for operating said actuating means independently of said control valve, and means for overcoming the force of said actuating means whenever a given pressure has been reached in the control valve to prevent said actuating means from thereafter having any effect on operation of the tractor-trailer braking system.

5. An advance valve for insertion in a fluid pressure system between a control valve and a relay valve having a chamber connected to the relay valve, a second chamber connected to the control valve, a pressure responsive movable wall between the chambers, a second pressure responsive movable wall forming one side of the second chamber, means for connecting the first chamber at times to an independent pressure source and at times to the second chamber, and means responsive to a control independent of the control valve for exerting a pressure tending to connect the first chamber to the independent pressure source.

6. An advance valve, for insertion in a fluid pressure system between a controlling pressure and a controlled pressure, having a chamber connected to the controlled pressure, a second chamber connected to the controlling pressure, a pressure responsive movable wall between the two chambers, a second pressure responsive movable wall forming one side of the second chamber, means for connecting the first chamber at times to an independent pressure source and at times to the second chamber, and means responsive to a control independent of the controlling pressure for exerting a pressure tending to connect the first chamber to the independent pressure source.

7. An advance valve, for insertion in a fluid pressure system between a controlling pressure and a controlled pressure, having a chamber connected to the controlled pressure, a second chamber connected to the controlling pressure, a pressure responsive movable wall between the two chambers, a second pressure responsive movable wall forming one side of the second chamber, the area of said second pressure responsive movable wall subjected to the pressure in said second chamber being greater than the area of the first pressure responsive movable wall subjected to the same pressure, means for connecting the first chamber at times to an independent pressure source and at times to the second chamber, and means responsive to a control independent of the controlling pressure for exerting a pressure tending to connect the first chamber to the independent pressure source.

8. In a tractor-trailer braking system having a power device for operating the trailer brakes, a power device for operating the tractor brakes, a manually operable control member, and a control valve actuated according to the manual pressure on said control member and operatively connected to both of said power devices, said control valve being arranged to operate said power devices substantially simultaneously maintaining a given ratio of effectiveness between them throughout the operating range, an advance valve adapted to control the operating pressure of the trailer power device and having a chamber connected to said trailer power device, a second chamber connected to the control valve, a pressure responsive movable wall between the chambers, a second pressure responsive movable wall forming one side of the second chamber, means for connecting the first chamber at times to an independent pressure source and at times to the second chamber, and means responsive to initial movement of said manually operable control member for exerting a pressure tending to connect the first chamber to the independent pressure source.

9. In a tractor-trailer braking system, a differential pressure power device for operating the tractor brakes, a differential pressure power device for operating the trailer brakes, a relay valve connected directly to said trailer power device to regulate the same, a control valve connected directly to said tractor power device and also connected to said relay valve and arranged to operate the same maintaining a given ratio of effectiveness between said power devices throughout the operating range, means for causing said relay valve to develop a predetermined pressure differential in the trailer brakes ahead of the pressure differential in the tractor brakes, and means for rendering the last-named means ineffective whenever the pressure differential in one of the power devices has reached a predetermined value.

10. In a tractor-trailer braking system having a power device for operating the trailer brakes, a power device for operating the tractor brakes, and a control valve operatively connected to both of said power devices to operate the same maintaining a given ratio of effectiveness between them throughout the operating range, means for applying the trailer brakes ahead of the tractor brakes comprising valve means for causing applying pressure to develop in the trailer power device, means independent of said control valve for actuating said valve means, and means for overcoming the force of said actuating means whenever a given pressure has been reached in the control valve.

11. In a tractor-trailer braking system having a power device for operating the trailer brakes, a power device for operating the tractor brakes, and a control valve operatively connected to both of said power devices to operate the same maintaining a given ratio of effectiveness between them throughout the operating range, means for applying the trailer brakes ahead of the tractor brakes comprising valve means for admitting applying pressure directly to said trailer power device, means for actuating said valve means adapted to be operated by said control valve, means for operating said actuating means independently of said control valve, and means for overcoming the force of said operating means whenever a given pressure has been reached in the control valve.

12. In a differential pressure operated braking system for a tractor and trailer combination, a differential pressure power device for operating the tractor brakes, a differential pressure power device for operating the trailer brakes, a first valve mechanism for causing operation of both of said power devices, a second valve mechanism associated only with the trailer power device which causes to develop a predetermined differential pressure in said trailer power device before the first valve mechanism develops an equal differential in the tractor power device, a solenoid for controlling the operation of said second valve mechanism, an electrical circuit controlling said solenoid, a switch in said circuit, and a single operator operated member controlling both said first valve mechanism and said switch.

13. In a tractor-trailer braking system having a differential pressure power device for operating the tractor brakes, a differential pressure power device for operating the trailer brakes, and a control valve operatively connected to both of said power devices to operate the same maintaining a given ratio of effectiveness between them throughout the operating range, a valve which opens to cause a differential pressure to develop in the trailer power device only, and a control for said valve acted on by opposing forces, one of which is automatically developed during the early stages of each tractor-trailer brake application and which tends to open the valve, and the other of which increases as the pressure differential in the tractor power device increases and which tends to counteract the valve-opening force.

14. A tractor-trailer power braking system comprising a power device for operating the trailer brakes, a power device for operating the tractor brakes, a control valve operatively connected to both of said devices and arranged to operate the same substantially simultaneously maintaining a given ratio of effectiveness between them throughout the operating range, said control valve being directly connected to at least the tractor power device, means for causing a predetermined initial pressure to be built up in the trailer power device without postponing normal operation of the tractor power device, means for actuating the aforesaid means before appreciable pressure has been developed in the tractor power device, and a single operator operated control for the entire tractor-trailer power braking system.

15. A tractor-trailer power braking system comprising a power device for operating the trailer brakes, a power device for operating the tractor brakes, a control valve operatively connected to both of said devices and arranged to operate the same substantially simultaneously maintaining a given ratio of effectiveness between them throughout the operating range, said control valve being directly connected to at least the tractor power device, means for causing a predetermined initial pressure to be built up in the trailer power device without postponing normal operation of the tractor power device, automatically operable means for actuating the aforesaid means before appreciable pressure has been developed in the tractor power device, automatically operable means for rendering said actuating means ineffective whenever a predetermined pressure has been developed in one of said power devices, and a single operator operated control for the entire tractor-trailer power braking system.

16. In a differential pressure operated braking system for a tractor and trailer combination, a differential pressure power device for operating the tractor brakes, a differential pressure power device for operating the trailer brakes, a first valve mechanism for causing operation of both of said power devices, a second valve mechanism associated only with the trailer power device which causes to develop a predetermined differential pressure in said trailer power device before the first valve mechanism develops an equal differential in the tractor power device, electrical means, including a switch, for controlling the operation of said second valve mechanism, and means under the control of the operator for actuating both said first valve mechanism and said switch.

17. In a tractor-trailer braking system having a power device for operating the trailer brakes, a power device for operating the tractor brakes, and a control valve operatively connected to both of said power devices and arranged to operate the same substantially simultaneously maintaining a given ratio of effectiveness between them throughout the operating range, means for applying the trailer brakes in advance of the tractor brakes comprising valve means for causing applying pressure to develop solely in said trailer power device, means for actuating said valve means, means for operating said actuating means independently of said control valve, and means for preventing said actuating means from having any further effect on operation of the tractor-trailer braking system after the applying pressure of the tractor power device has increased to substantially the level of the advance pressure produced in the trailer power device.

18. In a tractor-trailer braking system, a differential power device for operating the tractor brakes, a differential power device for operating the trailer brakes, a relay valve connected directly to said trailer power device to regulate the same, a control valve connected directly to said tractor power device and also connected to said relay valve and arranged to operate the same maintaining a given ratio of effectiveness between said power devices throughout the operating range, means for causing said relay valve to develop a predetermined pressure differential in the trailer power device ahead of the pressure differential in the tractor power device, and means for rendering the last-named means ineffective whenever the pressure differential in the tractor power device reaches the aforementioned "predetermined pressure differential."

EARL R. PRICE.

REFERENCES CITED

The following references are of record in the file of this patent:

UNITED STATES PATENTS

| Number | Name | Date |
|---|---|---|
| 2,100,053 | Hill et al. | Nov. 23, 1937 |
| 2,185,261 | Leupold | Jan. 2, 1940 |
| 2,161,642 | Stroup | June 6, 1939 |